US011888886B1

(12) United States Patent
Kudale et al.

(10) Patent No.: US 11,888,886 B1
(45) Date of Patent: Jan. 30, 2024

(54) CYBER SECURITY RISK ASSESSMENT AND CYBER SECURITY INSURANCE PLATFORM

(71) Applicant: Cowbell Cyber, Inc., Pleasanton, CA (US)

(72) Inventors: Jagannath Y. Kudale, Pleasanton, CA (US); Rajeev Gupta, Dublin, CA (US); Prabhakar Reddy, Dublin, CA (US); Vaidehi Kedlaya, Cupertino, CA (US); Harikrishna Prabhu, Pleasanton, CA (US); Nikita Nalawade, Dublin, CA (US)

(73) Assignee: Cowbell Cyber, Inc., Pleasanton, CA (US)

( * ) Notice: Subject to any disclaimer, the term of this patent is extended or adjusted under 35 U.S.C. 154(b) by 539 days.

(21) Appl. No.: 17/025,754

(22) Filed: Sep. 18, 2020

Related U.S. Application Data

(60) Provisional application No. 62/903,594, filed on Sep. 20, 2019.

(51) Int. Cl.
*H04L 9/40* (2022.01)
*G06F 18/214* (2023.01)
(Continued)

(52) U.S. Cl.
CPC ........ *H04L 63/1433* (2013.01); *G06F 18/214* (2023.01); *G06F 18/2433* (2023.01); *G06N 5/01* (2023.01); *H04L 63/1425* (2013.01)

(58) Field of Classification Search
CPC ............ H04L 63/1433; H04L 63/1425; G06F 18/214; G06F 18/2433; G06N 5/01
See application file for complete search history.

(56) References Cited

U.S. PATENT DOCUMENTS 7,552,480 B1 * 6/2009 Voss ..................... G06F 21/577
713/150
9,166,999 B1 * 10/2015 Kulkarni .............. G06F 21/31
(Continued)

OTHER PUBLICATIONS

Tao et al., "Optimal Combination between Subjective Weighting and Objective Weighting Based on maximum Square Sum of Distance for Information Security Risk Assessment", Aug. 2016, 7th IEEE International Conference on Software Engineering and Service Science, pp. 471-474 (Year: 2016).*

(Continued)

*Primary Examiner* — Kenneth W Chang
(74) *Attorney, Agent, or Firm* — VLP Law Group, LLP

(57) ABSTRACT

A cyber security risk assessment system is described. In an example implementation, the system may generate an input feature space including data associated with a computing system by collecting the data from a plurality of computer sources. The system may compute a likelihood of data-security breach incidents based on the input feature space using a first computer model, recognize events based on the input feature space using a second computer model, and determine a severity of the data-security breach incident or the event using a third computer model. In some instances, the system may generate risk factor scores based on the determined severity, data-security breach incident, and the event, where the risk factor scores indicate a computer security risk of a certain computer security aspect of the computing system. The system may then perform an action based on the risk factor scores.

20 Claims, 11 Drawing Sheets

(51) Int. Cl.
*G06F 18/2433* (2023.01)
*G06N 5/01* (2023.01)

(56) References Cited

U.S. PATENT DOCUMENTS

| | | | | |
|---|---|---|---|---|
| 10,432,605 | B1* | 10/2019 | Lester | G06F 21/552 |
| 2003/0220940 | A1* | 11/2003 | Futoransky | H04L 63/20 |
| 2010/0114634 | A1* | 5/2010 | Christiansen | G06Q 30/018 |
| | | | | 705/317 |
| 2011/0055852 | A1 | 3/2011 | Smith et al. | |
| 2011/0131658 | A1* | 6/2011 | Bahl | G06F 21/577 |
| | | | | 726/25 |
| 2011/0307957 | A1* | 12/2011 | Barcelo | G06Q 10/0635 |
| | | | | 726/25 |
| 2013/0080310 | A1 | 3/2013 | Bell et al. | |
| 2013/0104236 | A1* | 4/2013 | Ray | H04L 63/20 |
| | | | | 726/25 |
| 2014/0218389 | A1* | 8/2014 | Bennett | G06T 11/001 |
| | | | | 345/593 |
| 2015/0046223 | A1 | 2/2015 | Sewak | |
| 2015/0066577 | A1 | 3/2015 | Christiansen et al. | |
| 2015/0081592 | A1 | 3/2015 | Stubbs et al. | |
| 2015/0381649 | A1* | 12/2015 | Schultz | G06Q 10/0635 |
| | | | | 726/25 |
| 2016/0065608 | A1* | 3/2016 | Futty | H04L 63/1433 |
| | | | | 726/25 |
| 2016/0226905 | A1* | 8/2016 | Baikalov | H04L 63/1433 |
| 2016/0344762 | A1* | 11/2016 | Jou | G06F 21/577 |
| 2017/0063905 | A1* | 3/2017 | Muddu | G06F 3/04842 |
| 2018/0113773 | A1 | 4/2018 | Krishnan et al. | |
| 2018/0189332 | A1* | 7/2018 | Asher | G06F 16/215 |
| 2019/0182274 | A1* | 6/2019 | Doron | G06N 3/044 |
| 2019/0182287 | A1* | 6/2019 | Hanley | H04L 63/20 |

OTHER PUBLICATIONS

Zhang, Aoqian et al., Learning Individual Models for Imputation (Technical Report), arXiv:2006.03436v1 [cs.DB], Apr. 7, 2020, 14 pgs.

Song, Shaoxu et al., "Enriching Data Imputation With Extensive Similarity Neighbors", Proceedings of the VLDB Endowment, Jul. 2015, 12 pgs.

* cited by examiner

Figure 4A

| DATA SOURCE | Feature | Network Security (η = eta) | Cloud Security (κ = kappa) | Endpoint Security (ε = epsilon) | Dark Intelligence (ζ = zeta) | Funds Transfer (τ = tau) | Cyber Extortion (ξ = xi) | Compliance (μ = mu) | Insider Threat (ι = iota) |
|---|---|---|---|---|---|---|---|---|---|
| F, V | NetworkMalwareAndPhishingRiskIndicator | 1 | | | | | | | |
| V | NetworkBotnetInfectionRiskIndicator | 1 | | | | 1 | 1 | | |
| V | NetworkSpamPropagationRiskIndicator | 1 | | | | 1 | 1 | | |
| V, F | NetworkExploitationPotential | 1 | | | | | | | |
| V | NetworkFileSharingFrequency | 1 | | | | | | | 1 |
| V | NetworkPatchingCadence | 1 | | | | | 1 | 1 | |

Figure 4B

CYBER SECURITY RISK ASSESSMENT AND CYBER SECURITY INSURANCE PLATFORM

BACKGROUND

This application relates to computer security management systems. For example, this application describes technology relating to automatically tracking computer data and operations using various computer models to underwrite cyber insurance.

Currently, underwriting cyber security insurance is performed manually by a human underwriter who examines ten to fifteen data points, such as industry type, company revenue, and a number of employees, which the underwriter may subjectively use to underwrite a cyber security insurance policy.

However, current techniques for underwriting insurance fail to properly understand and assess the risk of a particular organization and/or computing system, for example, because existing techniques do not have access to the underlying data and operations of a computing system for which a cyber security policy is being underwritten. Although a human underwriter could potentially read through computer logs, it is virtually impossible for the underwriter to detect anomalies in the computer logs. Further, human underwriters are incapable of simultaneously considering the quantity or array of factors that contribute to an organization's computer security risk profile. Such a human underwriter both could not review incoming data quickly enough to assess the data before it becomes obsolete and would quickly become overwhelmed with the amount and types of data that contribute to the computer security risk profile.

Accordingly, manual underwriting of cyber security insurance is inefficient, error prone, and, because it does not have access to current computer operations, it does not use the most up-to-date data and therefore cannot properly assess the risk of a data breach.

Some existing cyber security companies track data external to an organization to detect security vulnerabilities and provide a single score to the company to alert the company of the vulnerability. However, these techniques have not been used in cyber security insurance and are not easily suited for this purpose, for example, because they fail to look at risks resulting from factors both external and internal to an organization/computing system, and, the techniques, especially those using single scores, also fail to match the insurance types, numerous aspects of cyber risk, varying coverage types and amounts, and other aspects of a cyber security policy.

Accordingly, there is a need for a solution for assessing the complexities of cyber security in an efficient and repeatable manner.

SUMMARY

A cyber security risk assessment system can be configured to perform particular operations or actions by virtue of having software, firmware, hardware, or a combination of them installed on the system that in operation causes or cause the system to perform the actions. One general aspect of the system includes: generating an input feature space by collecting data from a plurality of computer sources, the input feature space including data associated with a computing system; computing a likelihood of one or more data-security breach incidents based on the input feature space using a first computer model; recognizing one or more events based on the input feature space using a second computer model; determining a severity of at least one of the one or more data-security breach incidents and the one or more events using a third computer model; generating one or more risk factor scores based on the determined severity of the at least one of the one or more data-security breach incidents and the one or more events, each of the one or more risk factor scores indicating a computer security risk of a certain computer security aspect of the computing system; and performing an action based on the one or more risk factor scores.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4A and 4B illustrate example coverage and risk factor score maps.

DESCRIPTION

Figure 1:
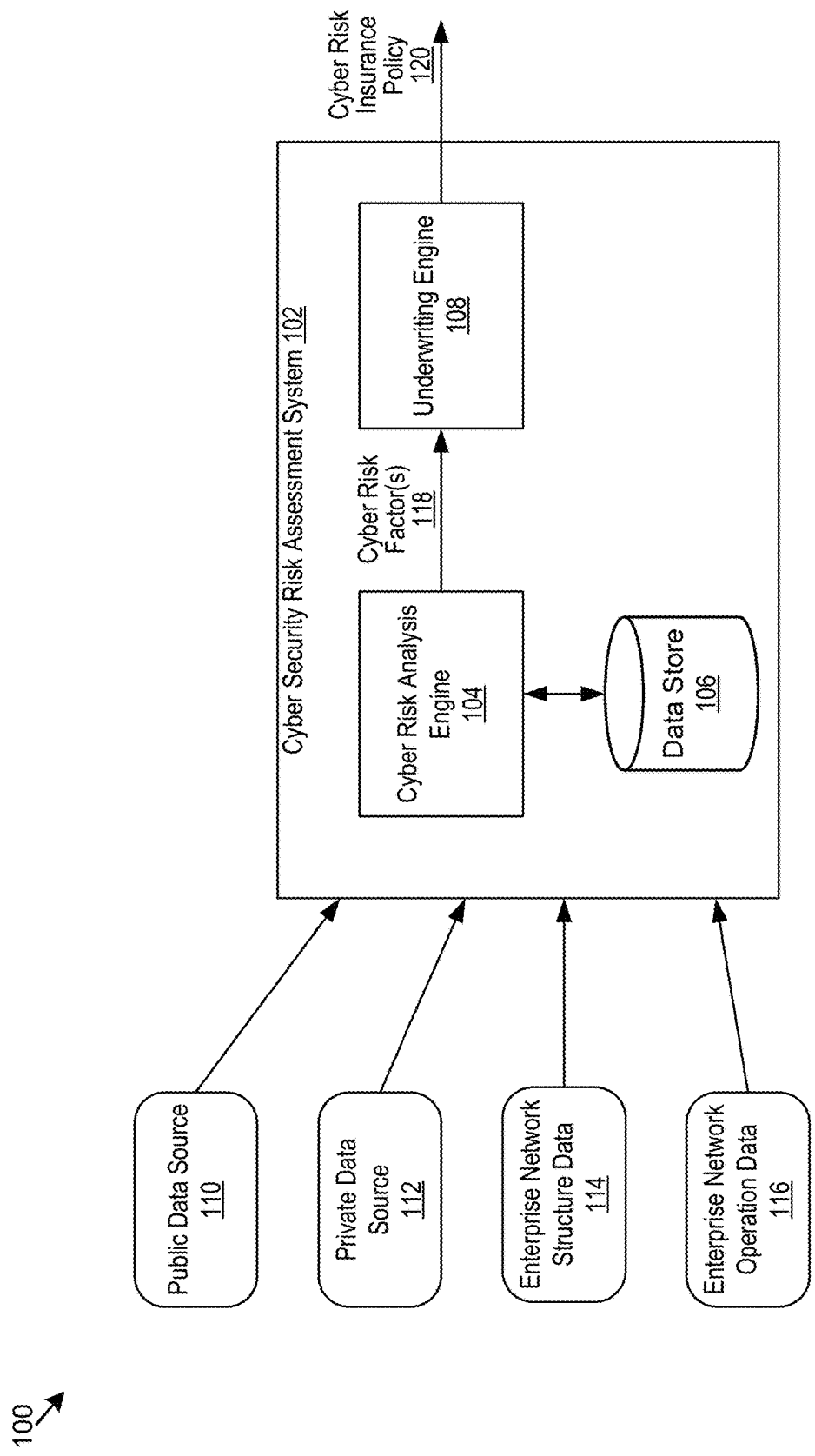
FIG. 1 is a system diagram of an example cyber security risk assessment system.

Among other benefits, the technology described herein improves upon that described in the Background Section. For instance, the technology described herein receives data from varied sources, generates an input feature space, and uses the input feature space with a set of artificial intelligence (AI) computer models to generate multiple risk factors that may be used to underwrite cyber insurance. Due to the improved data access and combination of computer models used, the technology provides an improved understanding of cyber security risk, for example, in a computing system that may include a network, cloud, and/or endpoint. The technology allows systems to work together using a library of connectors (e.g., Microsoft Secure Score™, Google Security Command Center™, Qualys™, etc.) between computing systems to generate multiple risk factors and, in some implementations, continuously evaluate a profile of cyber security risks.

In some implementations, the technology provides end-to-end automation for evaluating cyber security risks and, in some implementations, underwrite cyber security insurance. For instance, the generated risk factors may correspond to individual cyber security coverage areas. In some implementations, the technology may automatically underwrite a cybersecurity insurance policy, provide recommended coverages, costs, and risk levels to an underwriter, or may perform other risk mitigation measures on an affected computer system. In some instances, the technology may further use multiple separate risk factors, along with other data, to generate an aggregate risk factor for a computing system and/or organization (e.g., with multiple computing systems). In some instances, the connectors, multiple computer models, and automation may further continuously or more frequently underwrite cyber security insurance than could be done using traditional methods.

The correlated nature of security breach risks, the imperfect ability to prove loss from a breach to an insurer, and the inability of insurers and external agents to observe an enterprise's self-protection efforts have posed significant challenges to cybersecurity risk management. If self-protection of an enterprise is observable to an insurer, so that it can design a contract that is contingent on the self-protection level, then self-protection and insurance behave as compliments. With recent cyber-attacks the traditional network security or information technology (IT) expenditure is shifting to mitigating cyber risk in the aftermath of cyberattacks—including the new phases of response, recovery, and residual.

With reference to the figures, reference numbers may be used to refer to components found in any of the figures, regardless whether those reference numbers are shown in the figure being described. Further, where a reference number includes a letter (e.g., suffix) referring to one of multiple similar components (e.g., component 000a, 000b, and 000n), the reference number may be used without the letter to refer to one or all of the similar components.

FIG. 1 is a system diagram 100 of a cyber security risk assessment system 102, according to some implementations. In some examples, an enterprise may use computing devices running an operating system. The operating system may have known security risks. The risks may be quantified as one of the cyber risk factors to be used to evaluate the aggregate cyber risk factor.

In some examples, the diagram 100 includes a cyber security risk assessment system 102 and various data sources 110, 112, 114, and 116. As illustrated, the cyber security risk assessment system 102 may continuously or periodically receive various data from connectors to data sources, perform computations, and output risk factors and/or a cyber risk insurance policy 120, as described in further detail below. Although not illustrated, in some implementations, the connections between the cyber security risk assessment system and one or more of the data sources may be via a network, such as the Internet.

In some implementations, a cyber risk assessment system 102 and method is configured to quantify identified security threats by augmenting files representing threats with their associated probability (e.g., likelihood) and severity (e.g., magnitude of loss exposure). This new risk vector—insurable threats—may then be mapped to risk exposure and insurance coverage.

The cyber risk assessment system 102 may, in some implementations, include one or more hardware and/or virtual servers programmed to perform the operations, acts, and/or functionality described herein. The components of the cyber risk assessment system 102 may comprise software routines storable in one or more non-transitory memory devices and executable by one or more computer processors of the cyber risk assessment system 102 to carry out the operations, acts, and/or functionality described herein. In further implementations, these routines, or a portion thereof, may be embodied in electrical hardware that is operable to carry out the operations, acts, and/or functionality described herein.

In some implementations, as illustrated in FIG. 1, the cyber risk assessment system 102 may include a cyber risk analysis engine 104 that receives external and/or internal data from the sources 110, 112, 114, and 116 and/or the data store 106 and uses the received data to generate cyber risk factor(s) 118 (also referred to herein as risk factors). The cyber risk analysis engine 104 may transmit the cyber risk factors 118 to an underwriting engine 108, which may consider the risk factors in combination with costs, industry data, or other attributes for generating a cyber risk insurance policy 120. The cyber risk assessment system 102 and/or another connected computing device may output, for display to a user, risk factors, aggregate risk factors, or other data described herein.

In some implementations, the cyber risk assessment system 102 and method may implement an inside-out approach and use a library of insurable threats, which may act as an early detection signal for risk transfer. The inside-out approach and the library of insurable threats are used to provide insights to enterprise risk managers to understand the risk exposures, which may allow the risk managers to select appropriate coverage, implement remediation guidance, and optimize premium.

Additionally or alternatively, the cyber risk assessment system 102 may implement an outside-in approach with or separate to the inside-out approach. For instance, the outside-in approach may use data from various data sources, such as the public data source 110, for example. Inside-out and outside-in data are described in further detail below.

In one implementation, the cyber risk assessment system 102 and method implements a cyber security risk exposure assessment. The system and method may quantify identified security threats, for example, augmenting their records with probability and severity to map risk exposure.

In another implementation, the cyber risk assessment system 102 and method determines a cyber risk factor for an enterprise and/or associated computing system. The cyber risk factor allows the selection of coverage to match the enterprise's risk exposure and risk transfer needs.

Furthermore, in some implementations, the cyber risk assessment system 102 and method may use the cyber risk factors to identify an enterprise's security risk levels, which may allow the cyber risk assessment system 102 to provide remediation guidance to address the risks.

In some implementations, each cyber risk factor (CF) may include a numeric score, such as from 0-100, that directly correlates to the assessed risk exposure profile of one or more computing systems of an enterprise. The cyber risk factor can be advantageously applied as an early detection signal for risk transfer, to ensure that the premiums cover the organization's needs.

As illustrated, the cyber risk assessment system 102 may receive data from a public data source 110, private data source 112, enterprise network structure data 114, enterprise network operation data 116, or other data sources. For instance, the public data source 110 may include publicly accessible data and analytics describing a computing system. Private data source 112 may include data collected from private data sources, such as internally to the computing system (e.g., computer logs, browsing data, applications running on the computing system, etc.). The enterprise network structure data 114 may include data describing attributes of a network to which a computing system (e.g., one or more workstations, servers, etc.) are connected, such a network type, firewall attributes, number and type of connected devices, connection speed, etc. The enterprise network operation data 116 may describe operations of connected devices, such as network traffic into and/or out of a network or one or more computing devices associated with an enterprise. These and other inputs are described in further detail below.

Figure 2:
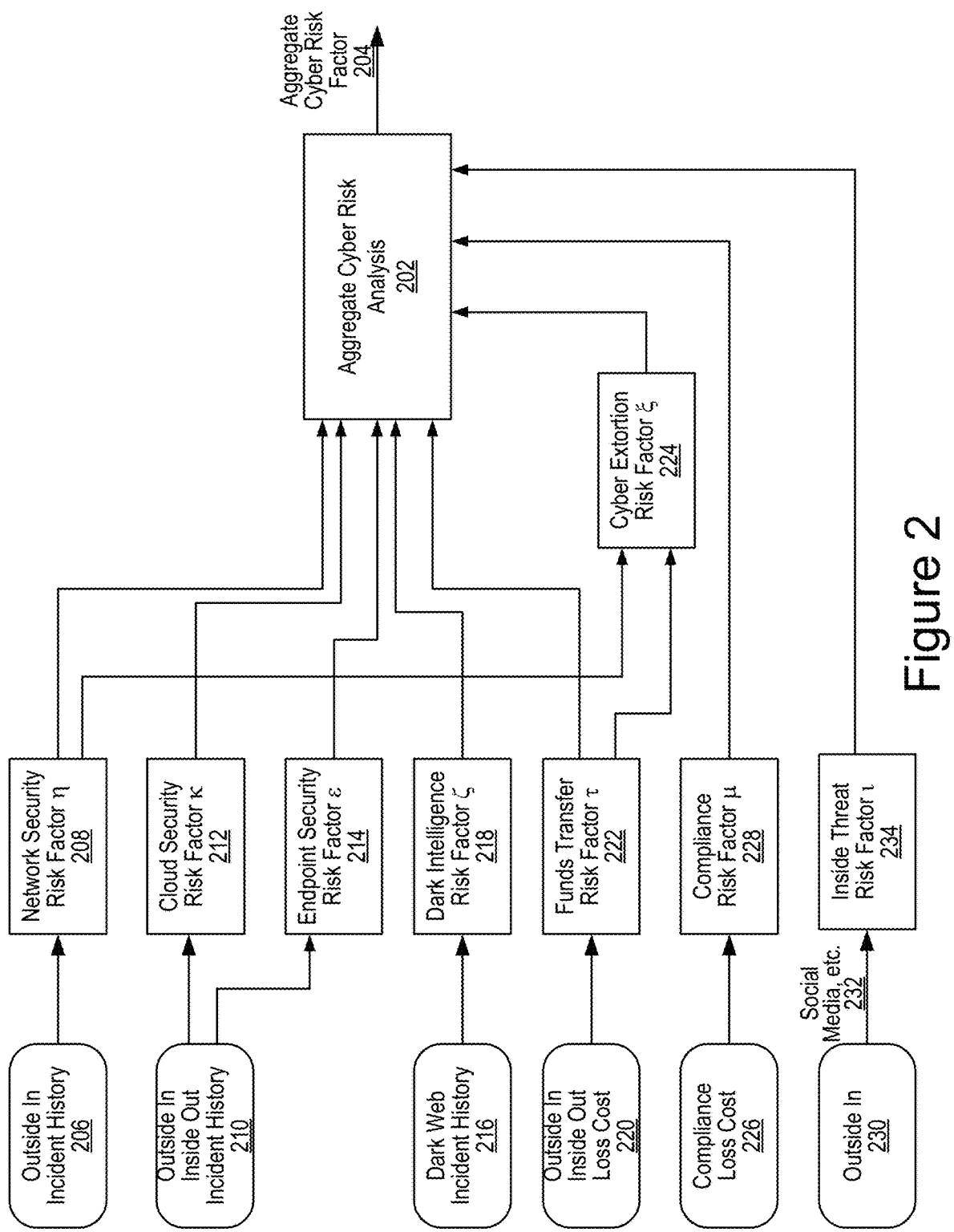
FIG. 2 is a system diagram of an example cyber risk analysis engine.

FIG. 2 is a system diagram of an example cyber risk analysis engine 104, according to some implementations. For instance, FIG. 2 shows an example of mapping of inputs to risk factors. Similarly, as illustrated, the cyber risk analysis engine 104 may use the various risk factors in an aggregate cyber risk analysis 202, for example, to generate an aggregate cyber risk factor 204. It should be noted that the data types and risk factors illustrated in FIG. 2 are provided by way of example and that other implementations are possible and contemplated herein. Further details for generating risk factors and an aggregate risk factor are described in reference to FIGS. 3A-5D.

In some implementations, in the computation of the risk factors based on received data, the cyber risk analysis engine 104 may take the recency, frequency, and severity of incidents, events, or outliers into account, as described below. The cyber risk analysis engine 104 may provide various selectable connectors, which may be application programming interfaces, routines, or other connections for receiving data associated with a computing system (e.g., of an enterprise). For instance, the cyber risk analysis engine 104 may have a connector for receiving outside-in incident history 206 describing incidents, although other implementations are possible, as described in further detail elsewhere herein.

In some implementations, the cyber risk assessment system 102 includes a cyber risk analysis engine 104 to generate cyber risk factor scores. In some implementations, the cyber risk analysis engine 104 also generates an aggregate cyber risk factor 204, which may be a synthesis of multiple sub-factors where each sub-factor correlates to a specific dimension of cyber risk posture.

In some implementations, each sub-factor, also referred to as a cyber risk factor, is generated as a result of a complex model that is an amalgamation of artificial intelligence (AI) models and, in some instances, actuarial inputs. The AI computer models can be an ensemble of various machine learning (MP)/AI techniques including, but not limited to, risk modeling, boosted decision trees, neural networks, and others.

The individual sub-factors may be combined using a weighted aggregator that brings in multiple dimensions including, but not limited to, the enterprise's risk profile, the industry associated with the enterprise and other predictors. In some examples, the system sources varied data from various endpoints that include loss cost, outside-in, inside-out, dark-web intelligence, business interruption data, and/or regulatory compliance data, among other data. Given the constant changing nature of a typical cyber risk exposure profile, the system constantly and periodically captures and syncs up the data, thereby transforming a profile landscape by continuously sourcing data from the relevant end-points to constantly keep the cyber risk factors updated.

In some implementations, the cyber risk analysis engine 104 generates the following example cyber risk factors (sub-factors), as described in further detail below.

(1) Network Security Cyber Risk Factor ($\eta$=Eta) at 208.

The network security cyber risk factor ($\eta$) may be derived from network security weakness indicators such as bot infection, potential for exploitation via adware, malware via browsers, penetration testing metrics on the organization's network. For instance, the cyber risk analysis engine 104 may receive outside-in incident history 206, such as external attempts to access the computing system, malware, etc., and map it to the network security cyber risk factor. Examples of network security features may include port infections, spam propagations, malware, etc.

(2) Cloud Security Cyber Risk Factor ($\kappa$=Kappa) at 212.

Inside-out data obtained from a cloud service security hub (such as Amazon Web Services™)), Azure®, and other cloud security integrations such as Splunk® is transformed to generate the cloud security cyber risk factor $\kappa$. Given a wide variety of cloud platforms, the cyber risk analysis engine 104 may implement various feature engineering techniques to canonicalize data to achieve normalization of features before training one or more machine learning models. In some instances, the cyber risk analysis engine 104 may use outside-in and/or inside-out incident history 210 to generate the cloud security cyber risk factor.

(3) Endpoint Security Cyber Risk Factor ($\varepsilon$=Epsilon) at 214.

Endpoints such as email servers, DNS servers, etc., may have a penetration test risk profile, which may get synthesized into relevant features that will train a predictive model (e.g., the incident predictive model 528) for an endpoint security cyber risk factor. For instance, the cyber risk analysis engine 104 may use outside-in and/or inside-out incident history 210 to generate the endpoint security cyber risk factor.

(4) Dark Intelligence Cyber Risk Factor ($\zeta$=Zeta) at 218.

Continuous or periodic scans from dark web chatter indicating domain and email-domain breaches, plain text exposure of email-ids, and/or exposed sensitive information 216 may be feature transformed to a feed into a computer model that learns the hackability or hack worthiness of a computing system associated with an organization/enterprise. The cyber risk analysis engine 104 may thereby generate the dark intelligence cyber risk factor $\zeta$. For the dark intelligence cyber risk factor $\zeta$, feature engineering may involve text mining of dark web scans to transform textual information to numeric features.

(5) Funds Transfer Cyber Risk Factor ($\tau$=Tau) at 222.

Risk markers related to email encryption and susceptibility to email-id hacks, for example in outside-in and/or inside-out loss cost data 220 may be learned to generate a score for the funds transfer cyber risk factor $\tau$. For example, the cyber risk analysis engine 104 may determine a risk that a digital funds transfer may be intercepted or fraudulent based on various collected data.

(6) Cyber Extortion Cyber Risk Factor ($\xi$=xi) at 224.

The cyber extortion cyber risk factor $\xi$ may use features that are also used for the funds transfer cyber risk factor $\tau$ and/or the network security cyber risk factor $\eta$. For instance, the cyber risk analysis engine 104 may provide, as input for a computer model for this factor, features from the network security cyber risk factor $\eta$ related to markers for potential malware infections (that could lead to ransomware).

(7) Compliance Cyber Risk Factor ($\rho$=Mu) at 228.

The cyber risk analysis engine 104 may weight industry compliance data using relevance to a computing system's/organization's industry vertical and transformed into normalized features to train a compliance model. For instance, the cyber risk analysis engine 104 may train a computer model using the input in order to produce a numeric score for the compliance cyber risk factor $\mu$ at 228.

In some implementations, the compliance cyber risk factor µ may cover CIS (Center of Internet Security) benchmarks, NIST CSF (Cyber Security Framework), and CSC-20 (Critical Security Controls) compliance. For instance, $\mu_{cis}$ factor may be calculated using the benchmarks provided by the CIS framework; $\mu_{csf}$ factor may be calculated using the standards, guidelines, and best practices defined by the National Institute of Standards and Technology Cyber Security Framework; and $\mu_{csc}$ factor may use top 20 CIS Critical Security Controls (CSC), for instance, from the perspective of a hacker.

The cyber risk analysis engine 104 may compute the compliance cyber risk factor µ as follows $$\mu = b_{cis}\mu_{cis} + b_{csf}\mu_{csf} + b_{csc}\mu_{csc} + b_0,$$

where b denotes weights for each sub µ that is learned by training a model and $b_0$ denotes an industry constant, $b_0$ if there is no data for a given organization, else $b_0=0$.

(8) Insider Threat Cyber Risk Factor (ι=Iota) at 234.

Input for the insider threat cyber risk factor ι may come from, but is not limited to, outside-in data, such as current and past employees' opinions and viewpoints on social media and other platforms. For instance, the cyber risk analysis engine 104 may extract sentiment and attrition markers as features from web-harvested data and suitably trained to learn potential detrimental intent (or lack of one) to power this metric. For example, feature engineering may involve natural language processing of blog posts, opinions and other textual content mentioned on the internet and social media to glean attrition and sentiment metrics.

Aggregate Cyber Risk Factor (ACF) at 204.

The aggregate cyber risk factor (ACF) may be a combination of the scores for some or all of the cyber risk factors via a weighted summation wherein the weights themselves can come from i) machine learning model; and/or ii) actuarial inputs. In some implementations, the output value of the aggregate cyber risk factor is normalized to fit into 0-100 range.

In some implementations, the cyber risk analysis engine 104 may compute the aggregate cyber risk factor using:

$$ACF = \Sigma(w_i F_i) + K,$$

where w denotes weights that are learned from a machine learning model that may include an ensemble whose features include, but are not limited to, industry specific metadata and actuarial data; F denotes each cyber risk factor as described above; and K denotes an industry constant administratively set for an industry associated with the computing system, K if there is no data for given organization, else K=0.

In some implementations, an aggregate cyber risk factor can be generated for a certain computing system or organization. A Company ACF (Cσ=C-sigma) denotes ACF pertaining to a given organization.

In other implementations, an aggregate cyber risk factor can be generated for an industry. An Industry ACF (Iσ=I-sigma) denotes ACF pertaining to a given industry. In some implementations, an Industry is as identified by NAICS (North American Industry Classification System), SIC (Standard Industrial Classification), or another suitable industry classification system. The universe of all organizations for which ACF is calculated may be grouped by their industry category and a central metric (mean, median, mode—depending on number of data points for each industry) may be computed as the Industry ACF for a given industry.

In some implementations, the cyber risk factors may be generated using firmographic data that may include, but is not limited to, location of the organization or enterprise, employee count, industry, sub industry, parent organization, is organization MNC, annual revenue, monthly revenue, weekly revenue, daily revenue, user elasticity index, user count, daily active user, weekly active users, monthly active users, daily new users, user lifetime value, credit score, public data, private data, and/or employee contractor ratio.

In some implementations, the cyber risk assessment system 102 may implement continuous exposure assessment for cyber risk factors, as described in further detail elsewhere herein. The cyber risk assessment system 102 may assess insurable threats and their mapping to risk exposures on continuous basis thereby leveraging both inside-out and outside-in data sources. Continuous risk exposure may be measured by its resulting risk-ratings factor, cyber risk factor, and/or aggregate risk-ratings factor or aggregate cyber risk factor.

In some implementations, an underwriting platform (e.g., using the underwriting engine 108) may be implemented based on continuous risk-exposure assessment that provides risk measurement and pricing criteria to derive premiums for cyber insurance coverage at a granular level. The cyber risk assessment system 102 may continuously evaluate insurance using insights from an analysis of a statistical distribution, for example, following a piecewise distribution-based award/penalty mechanism.

In some implementations, the cyber risk assessment system 102 may implement usage-based insurance for cyber security risks. In some implementations, usage-based insurance for cyber security is a type of insurance coverage that is calculated based on continuous underwriting platform where its premiums may be based on evolving risk on an ongoing basis. For instance, the underwriting engine 108 may derive the premium from a risk-ratings factor for an organization, the organization's head count, its revenue size, its industry class, and its primary domain name among other things.

Figure 3A:
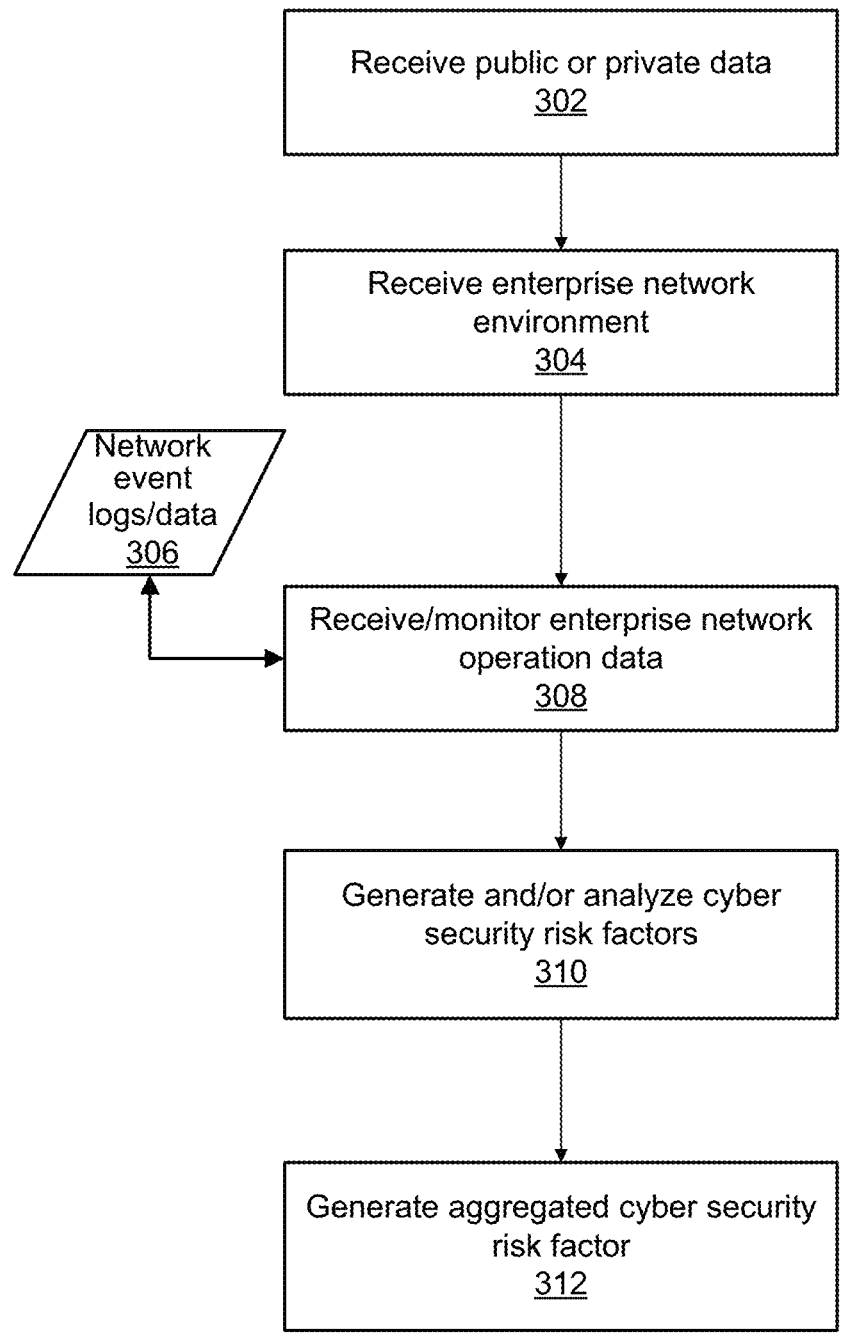
FIGS. 3A and 3B are flowcharts illustrating example cyber risk assessment methods.

FIG. 3A is a flowchart illustrating a cyber risk assessment method according to some implementations. Implementations of the operations illustrated in FIG. 3A are described in further detail in reference to FIGS. 3B-5C, as well as throughout this description.

At 302, the cyber risk analysis engine 104 may receive public or private data. For example, the cyber risk analysis engine 104 may retrieve, receive, or otherwise monitor data on a certain computing system or on devices with which the certain computing system interacts. In some implementations, the monitored data may also be associated with a number of endpoint devices (e.g., personal computers, smartphones, etc.), network equipment, virtual devices, etc., of a given organization.

At 304, the cyber risk analysis engine 104 may receive an enterprise network environment. For example, the cyber risk analysis engine 104 may receive data describing attributes of a computing system and/or organization. For instance, the data may describe a structure of the enterprise network environment describing devices with access to proprietary or confidential data, how the devices are connected, network security devices, programs, or firewalls, etc.

At 306, the cyber risk analysis engine 104 may receive network event logs or data and, at 308, the cyber risk analysis engine 104 may receive or monitor enterprise network operation data. For instance, the network logs or data may be internal logs of computing devices or a computing system, for example, reflecting interaction with data, especially as it passes through the network. For instance, the network event logs/data may indicate inside-out or outside-in data transfers, requests, etc.

At 310, the cyber risk analysis engine 104 may generate and/or analyze cyber security risk factors. For instance, the cyber risk analysis engine 104 may feed the enterprise network operation data into one or more computer models, which have been trained using one or more supervised or unsupervised algorithms, as described elsewhere herein. In some implementations, a model may be trained for each risk factor using one or more features mapped or weighted for that risk factor.

At 312, the cyber risk analysis engine 104 may generate an aggregated cyber security risk factor. For instance, the cyber risk analysis engine 104 may combine risk factors and, in some implementations, additional data, as described in further detail below.

Figure 3B:
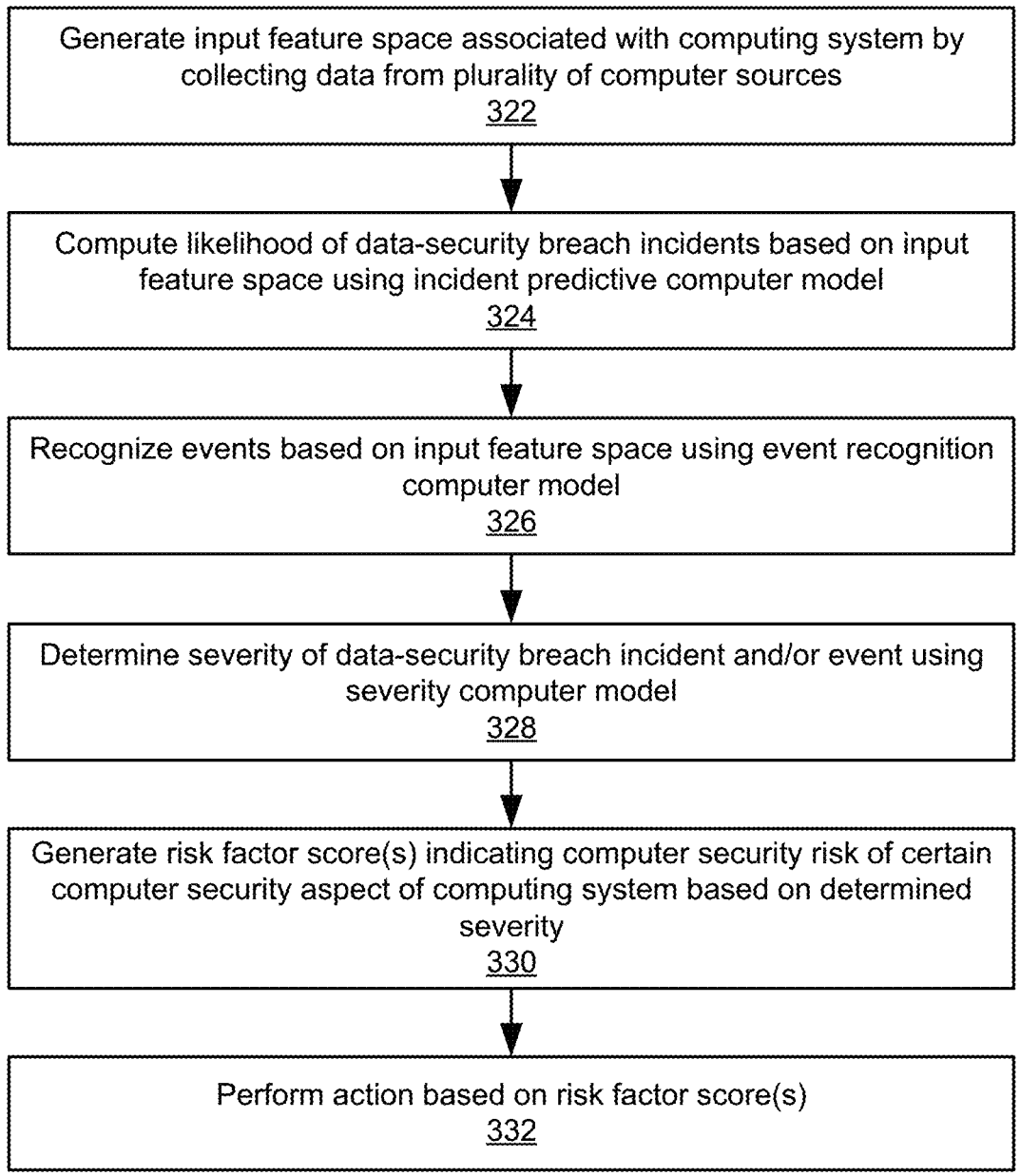

FIG. 3B is a flowchart illustrating the cyber risk assessment method according to some implementations.

At 322, the cyber risk analysis engine 104 may generate an input feature space by collecting data from a plurality of computer sources. For instance, the input feature space may include data associated with a computing system or set of computing systems of an organization for which a cyber security insurance policy is being underwritten. Additional details for generating the input space are described elsewhere herein.

In some implementations, the cyber risk analysis engine 104 may generate the input feature space by receiving outside-in data from a first computer source external to the computing system, and receiving inside-out data from a second computer source internal to the computing system. In some implementations, the cyber risk analysis engine 104 may collect raw data, for instance, directly from various computing systems using connectors to internal or external data sources. For example, the cyber risk analysis engine 104 may collect data from endpoints indicating operations and attributes (e.g., inside-out data) pertaining to cyber security, data from external sources indicating attempted or actual data breaches (e.g., outside-in data), or other data (lost cost, dark intelligence, business interruption, regulatory, etc.). For example, for inside-out data, a user may grant access on a computer to internal operations, services used, etc.

In some implementations, the cyber risk analysis engine 104 may generate the input feature space by receiving user input indicating a connector to the plurality of computer sources and receiving, from the plurality of computer sources using the software connection, a computer log associated with the computer security risk of the certain computer security aspect of the computing system. For instance, a connector may include a software connection between the processor and the computer sources.

In some implementations, the cyber risk analysis engine 104 may use direct data and/or may derive features based on the received data. For instance, the cyber risk analysis engine 104 may generate analytics and/or augment data to generate the feature space. In some implementations, the cyber risk analysis engine 104 may detect incomplete data in received data and perform data imputation for the detected incomplete data. The cyber risk analysis engine 104 may use statistical or categorical methods to fill in blanks in the input feature space. In some instances, the cyber risk analysis engine 104 may use similar businesses to fill in the blanks and/or give a peer score comparison. For instance, the cyber risk analysis engine 104 may use the similarity model described in reference to FIG. 5B.

At 324, the cyber risk analysis engine 104 may compute a likelihood of one or more data-security breach incidents based on the input feature space using a first computer model. For example, as described in reference to FIGS. 5B and 5C, the cyber risk analysis engine 104 may use a time-series based Recency, Frequency, Monetary Value (RFM) or other model to compute a likelihood of one or more incidents occurring for a particular organization, computing device, etc.

In some implementations, at 326, the cyber risk analysis engine 104 may recognize one or more events based on the input feature space using a second computer model. For example, as described in reference to FIGS. 5B-5D, the cyber risk analysis engine 104 may use an isolation forest, classifier, or other model to recognize one or more events for a particular organization, computing device, etc.

At 328, the cyber risk analysis engine 104 may determine a severity of at least one of the one or more data-security breach incidents and the one or more events using a third computer model. In some implementations, the cyber risk analysis engine 104 may use a severity model, as described in reference to FIG. 5B to determine a severity of an incident and/or event, for example, based on an output of the incident predictive model, an output of the event recognition, and/or the input feature space.

At 330, the cyber risk analysis engine 104 may generate risk factor score(s) indicating a computer security risk of certain computer security aspect of computing system based on determined severity. For instance, the factor scores may be based on the determined severity of the data-security breach incident(s) and/or the event(s). Each of the risk factor scores may indicate a computer security risk of a certain computer security aspect of the computing system, as described above.

In some implementations, the cyber risk analysis engine 104 may generate one or more risk factor scores using an output of a third computer model (e.g., the severity model described below) with a heuristic rule-based mapping. Further details are described in reference to 536 and 538 in FIG. 5C.

At 332, the cyber risk analysis engine 104 may perform an action based one or more of the risk factor scores. For example, the action may include performing a corrective action on the computing system to address the computer security risk. For instance, the particular risk factor and its associated score may determine an area of risk and/or its severity. For example, the cyber risk analysis engine 104 may tighten network security settings in response to a high (e.g., satisfying a threshold) risk that there will be an incident or event breaching a firewall, although other implementations are possible.

In some implementations, the action may include underwriting one or more coverages for cyber security insurance associated with respective risk factor scores. For instance, each area of cyber security insurance coverage may correspond to one or more risk factor scores indicating a risk of loss or data breach in that area. For example, the underwriting engine 108 may use a cloud security risk factor score along with other details, such as pricing, amount of data stored in a cloud, or other details that allow the underwriting engine 108 to determine price and/or eligibility of an organization to obtain cyber insurance coverage for cloud data for a computing system. It should be noted that other actions are possible and contemplated.

Figure 4A:
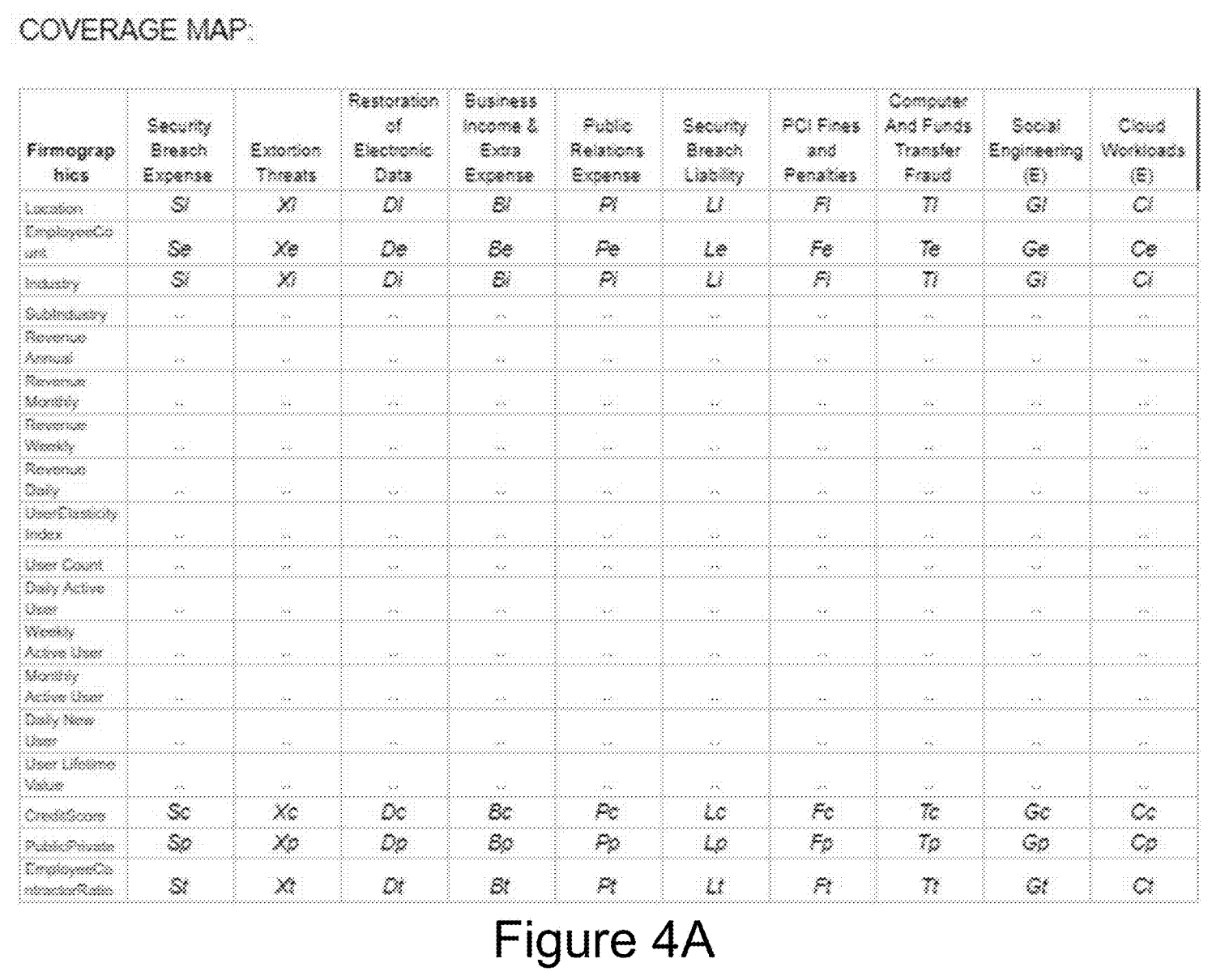

FIG. 4A illustrates a coverage map according to an example. The illustrated example shows example firmographics data mapped to cyber security risks. Each cell may include a binary value and/or a weighting indicating the importance of the particular data or feature to the respective risk. These features, data points, and risk are provided by way of example.

FIG. 4B illustrates a coverage map according to an example. For instance, the table shows an example mapping of data sources and/or features to risk factors. The cyber risk analysis engine 104 may use the values and/or weights, such as are shown in the tables of FIGS. 4A and/or 4B to compute cyber security risk factor scores. For example, the tables may indicate which features are used to train and/or input into which model and/or for which risk factor.

An example of a formula for computing various scores or coverages is given below:

| COVERAGES | COVERAGE LIMIT ESTIMATES |
|---|---|
| Security Breach Expense | $\eta\Sigma S + \kappa\Sigma S + \ldots i\Sigma S$ |
| Extortion Threats | $\eta\Sigma X + \kappa\Sigma X + \ldots i\Sigma X$ |
| Restoration of Electronic Data | $\eta\Sigma D + \kappa\Sigma D + \ldots i\Sigma D$ |
| Business Income & Extra Expense | ... |
| Public Relations Expense | ... |
| Security Breach Liability | ... |
| PCI Fines and Penalties | ... |
| Computer And Funds Transfer Fraud | ... |
| Social Engineering (E) | ... |
| Cloud Workloads (E) | $\eta\Sigma C + \kappa\Sigma C + \ldots i\Sigma C$ |

Figure 5A:
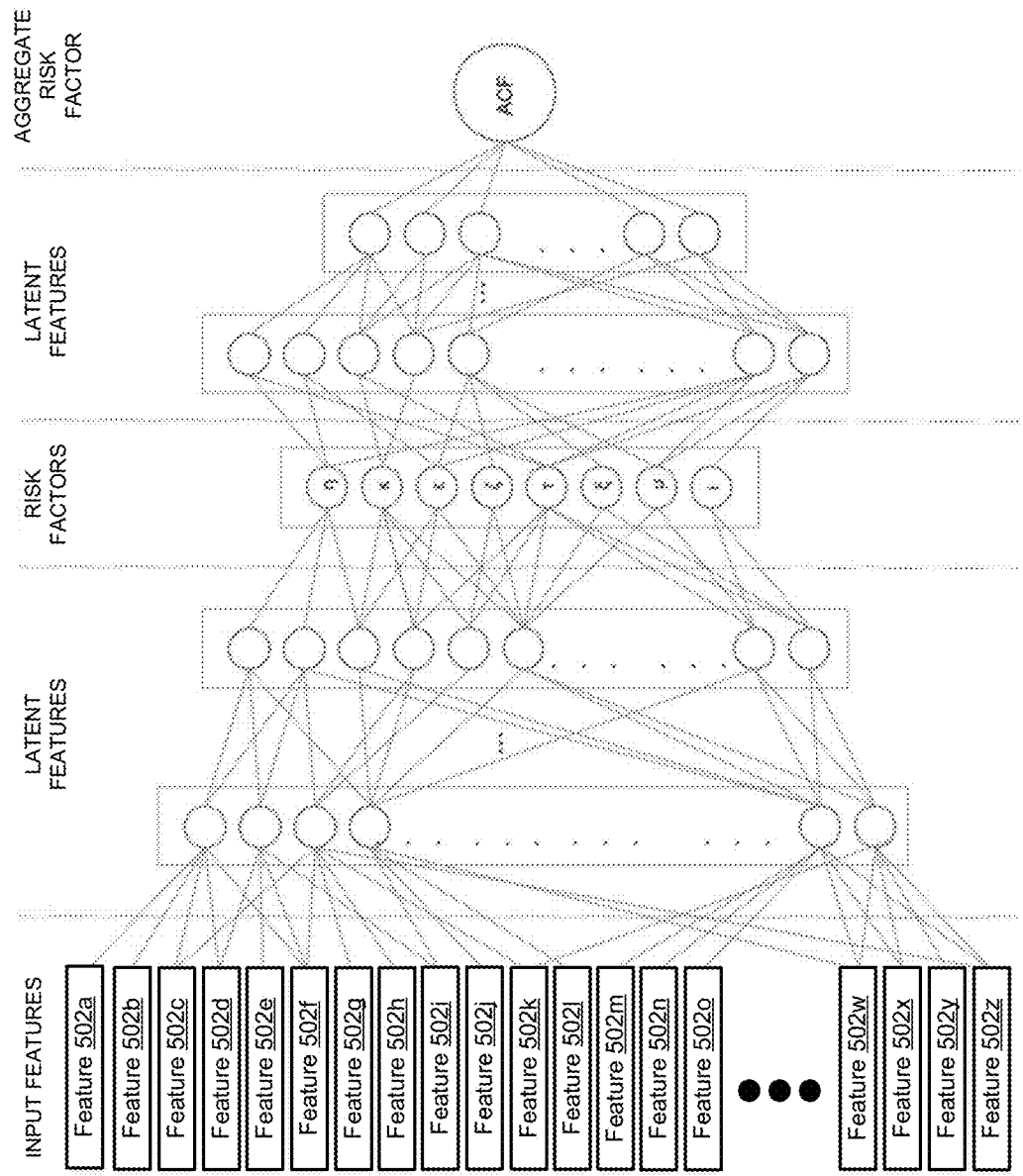
FIG. 5A illustrates an example method for generating a set of risk factors and an aggregate cyber risk factor.

FIG. 5A illustrates the process for generating the aggregate cyber risk factor in some examples. As illustrated, the cyber risk analysis engine 104 may receive a feature space, which may include a set of features 502a . . . 502z. In some examples, the input data source includes publicly available cyber security related data, private cyber security data, or enterprise provided cyber security data, etc. For example, in one configuration, a computing device associated with an enterprise may provides access, such as via an API, to the cyber risk analysis engine 104 to access the network logs and traffic data from the enterprise's edge devices, such as a firewall. For example, the enterprise may grant API access to a computing system's firewall or edge devices or to the enterprise's cloud service providers, such as AWS™. The cyber risk assessment system may then access the firewall or the cloud service providers to obtain the network traffic logs to obtain data for evaluating cyber security risk.

As illustrated, the input feature space may be fed into one or more models to generate one or more hidden layers of latent features. In some instances, these latent features may further be used to generate the risk factors. In some implementations, the risk factors may be fed into one or more models, with associated latent features, to generate an aggregate risk factor. Additional details for generating risk factors and an aggregate risk factor are described in reference to FIGS. 5B-5D below.

Figure 5B:
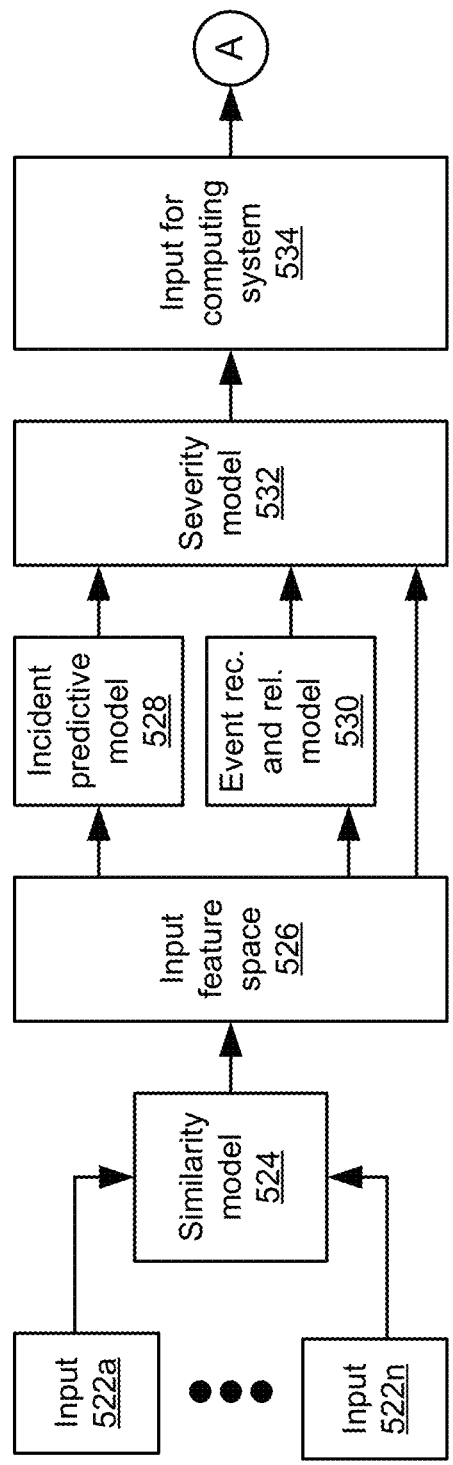
FIG. 5B-5C illustrates an example method for generating a set of risk factors and an aggregate cyber risk factor, including performing feature engineering.
Figure 5C:
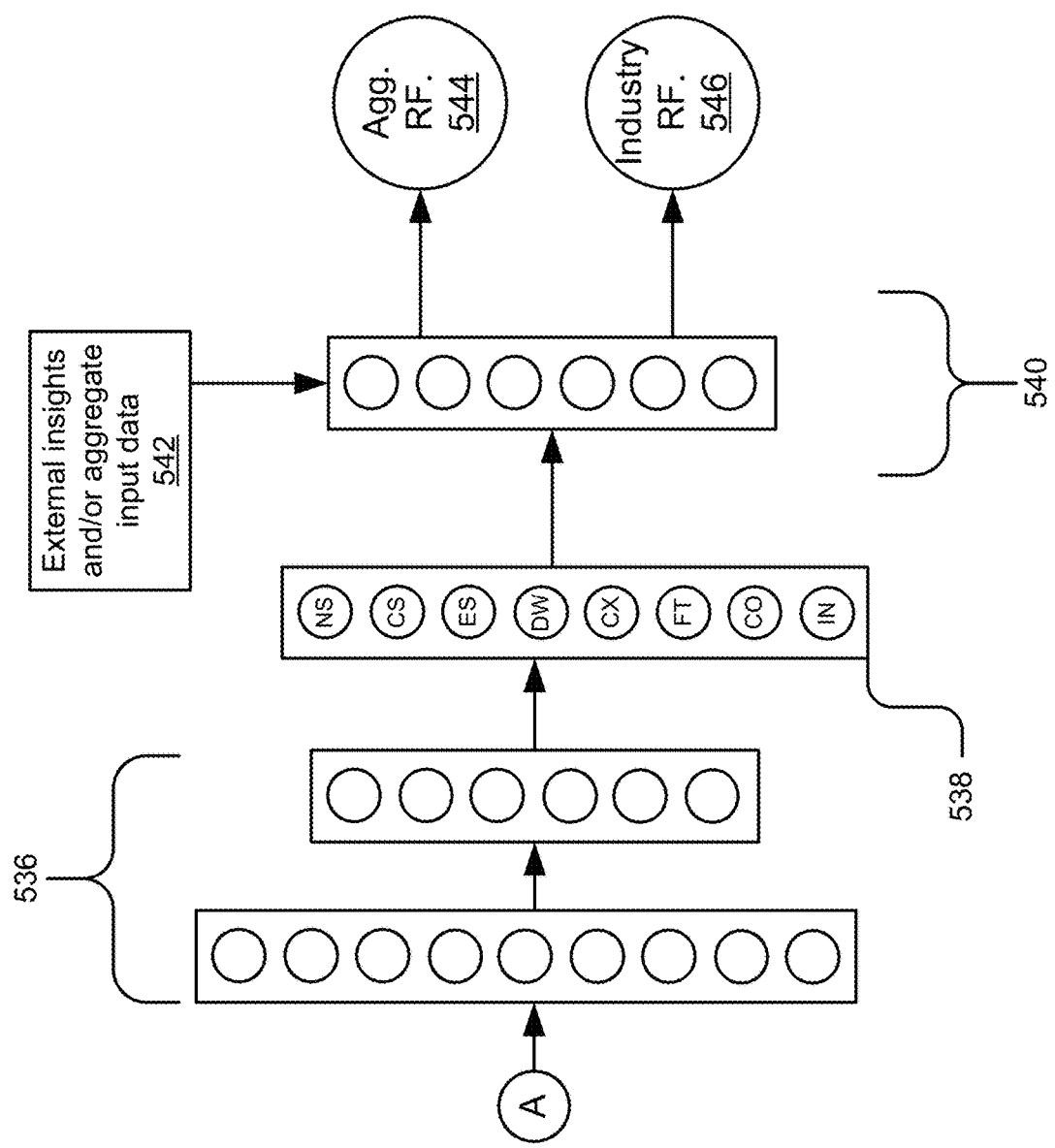

FIG. 5B-5C illustrates an example process for generating the aggregate cyber risk factor and performing feature engineering, according to some implementations. In some implementations, the cyber risk analysis engine 104 may receive input 522a . . . 522n, as described in further detail above for one or more organizations or computing systems. For instance, the input may be retrieved from data sources via various internal and/or external connectors to other systems or logic that collect data. For instance, the cyber risk analysis engine 104 may receive lost cost input (e.g., from Adivsen™, other privacy rights sources, etc.), outside-in input (e.g., from FICO™, Cowbell Scanner™, etc.), inside-out input from a client computing system (e.g., from MS Secure Store™, GCP Security Command Center™, AWS Security Hub™, Security Studio™, etc.), dark web intelligence input (e.g., from Dark Owl™, etc.), business interruption input (e.g., from Baker Tilly™, Verisk™, etc.), regulatory and compliance input (e.g., from inside-out data, Cowbell Scanner™, security certificates), etc. For example, the cyber risk analysis engine 104 may receive data, such as firmographics, technographics, dark web intelligence, security compliance, loss cost, business interruption, insurance claims, etc.

In some implementations, the cyber risk analysis engine 104 may input the inputs 522 into the similarity model 524, which may perform data imputation and/or comparisons with other similar computing systems or organizations. For example, the similarity model 524 may use a statistical approach to determine data proxy when components of the data are insufficient or missing for a computing system or organization in question. Where the incomplete data is categorical data, the similarity model 524 may use a rule-based model, for example, by enriching data imputation with extensive similarity neighbors. Where the incomplete data is numerical data, the similarity model 524 may use imputation via one or more individual models (e.g., supervised regression). It should be noted that these methods are provided by way of example and that other models for data imputation are possible and contemplated.

In some implementations, the similarity model 524 may find the top k similar organizations or computing systems to that being analyzed, for example, for purposes of data imputation, size comparison, or relative positioning (e.g., for a relative weighting or score of a risk factor in the context of an industry).

In some implementations, the output of the similarity model and/or the inputs may be a defined as an input feature space 526, which may represent a set of features or data. In some implementations, the input feature space 526 may include several hundred or thousand features describing data, structure, or operations of an organization and/or its computing systems.

In some implementations, an incident predictive or indicative model 528 may receive some (e.g., based on a mapping of relevant features and incidents) or all of the features of the input feature space 526. The incident predictive model 528 may be a computer model that takes into account incidents, such as a data security breach incident, to predict probabilities for each incident type for each organization, organization type, computing system, or computing system type. Examples of incidents include, but are not limited to those provided in the table:

| INCIDENTS | Likelihood (current-2020) | 2019 | 2018 | 2017 |
|---|---|---|---|---|
| Privacy Breach | | | | |
| Malicious Data Breach | | | | |
| Unintended Data Breach | | | | |
| Stolen Data | | | | |
| Network Disruption | | | | |
| Phishing & Spoofing | | | | |
| Skimming | | | | |
| Cyber Extortion | | | | |
| Configuration/Processing Errors (IT) | | | | |
| Industrial Controls/Ops | | | | |
| ID Theft | | | | |
| Others | | | | |
| Etc. | | | | |

As illustrated, the data describing incidents may also be tagged with dates and/or severities, which allow the incident predictive model 528 to use a time-series regression, for example, to more heavily weight more recent incidents. The incident predictive model 528 may predict the likelihood of occurrence of incidents for a given computing system or those of an organization based on the incident data. For instance, the incident predictive model 528 may weight incidents based on year, industry type, incident state, revenue, number of employees, users, or computing systems. For instance, the incident predictive model 528 may use a time-series based RFM model.

In some implementations, an event recognition and relative model (also referred to as the event recognition model) 530 may receive some (e.g., based on a mapping of relevant features and events) or all of the events of the input feature space 526. The event recognition model 530 may be a computer model that detects events or outliers. Events may be outliers, anomalies, or occurrences in data or computer operations that are not necessarily classified as incidents. For example, the event recognition model 530 may feed features of the input feature space into an isolation forest, for example, or another unsupervised or supervised model. Example operations for detecting outliers are described in further detail below in reference to FIG. 5D.

In some implementations, the event recognition model 530 may additionally or alternatively classify events based on their severity or importance. For example, the event recognition model 530 may use a classifier (e.g., a decision tree or ensemble-based model) or relative ranking (e.g., using statistical analysis), to identify importance of events, for example, based on data describing loss due to an event (e.g., as described above)

In some implementations, the event recognition model 530 may include one or more relative models for determining the relative importance or severity of events. For example, relative models I, II, III may be selected based on the data, data availability, or administrative or technical constraints.

Relative model I may include constructing a SIEM (security and incident management system, such as Splunk® or ArcSight®) data based dataset with features on one side and severity flags on the other side. For instance, the severity flags could be quantified as binary (0,1), triage (high, medium, low), or a scalar. Relative model I may roll up one or multiple elements at an organization and/or computing system level. In some instances, the relative model I may include a regression model to predict importance levels, for example, by ranking predicted importance to establish relative scores.

Relative model II may be used in some instances, such as when data for relative model I is not available or is incomplete. For instance, if a SIEM dataset is unavailable, then the cyber risk analysis engine 104 may use a proprietary loss data set that may have a time-series of features data with an incident flag (e.g., yes/no indicating whether an incident occurred). For example, the relative model II may include a classification model that predicts whether a certain incident will happen or not given a certain vector of data points. For instance, based on the probability output, the relative model II may rank order the records in order to establish relative scores.

Relative model III may include a rank ordering of organizations or computing systems based on a loss amount after adjusting for recency, sector, or size, etc. For example, for a given organization, the relative model III may use a similarity model and may pick 'NI' similar companies and average their scores.

In some implementations, a severity model 532 may receive output from the incident predictive model 528, the event recognition and relative model 530, and/or input feature space 526. The severity model 532 may determine an incident, event, or vulnerability severity. In some implementations, the severity model 532 may compute a sensitivity or impact in terms of loss of data, time, or money.

In some implementations, the severity model 532 may include a table with incidents, events, or other data, which may include a monetary loss due to the incident, event, etc., and a date at which it occurred. For example, the following is an example of such a table:

| | $ Severity (current-2020) | 2020 | 2019 | 2018 |
|---|---|---|---|---|
| Incidents | | | | |
| . | | | | |
| . | | | | |
| Events | | | | |
| . | | | | |
| . | | | | |
| Others | | | | |

The severity model 532 may use monetary loss, data loss, time loss, etc., severity along with the dates, for example, to determine a severity of features, incidents, events, etc. For example, the similarity model 532 may use a time-series RFM model. The projected severity may be specific to an incident type or factor. For example, a severity of an incident or event may be determined and that incident may be mapped to a particular risk factor, which may then be used to determine the risk factor score.

The severity model 532 may include one or more forecasting models may estimate or project a severity for a sector or size segment. The model(s) may also be specific to incident types where a minimum, maximum, or various percentiles are analyzed for a particular incident type in order to understand a distribution or trajectory of severity projections.

The severity model 532 may output severity-rated incidence, events, vulnerabilities, features, etc., at 534. For example, the output of the severity model 532 may be fed, as inputs for organization(s)/computing system(s) 534 into one or more risk factors models 536. The risk factors model 536 may include one or more computer models with one or multiple layers or latent features. In some implementations, the risk factors model 536 may include a heuristic rule-based and/or stochastic mapping that maps features, incidents, events, etc., to one or more individual risk factors, which may, in turn, be aligned with specific insurance coverages types/areas. The artificial intelligence models of the risk factors model(s), along with the other models herein, allow a large number of features and data to be analyzed to determine the quantified risk factors scores that may be used to underwrite insurance, correct cyber security risks, or perform other operations.

Example features or inputs 534 for a risk factors model may include data, such as firmographics, third-party technographics, third-party risk scores, compliance certificate extractions, incident history, loss history, proprietary data (e.g., claims history, connector data, cowbell scanner, engineered features like plasticity index, etc.), severity model outputs, derived features, previous months of data, recency, frequency, severity indicators/measures of numeric data, and/or other features.

In some implementations, the risk factors model 536 may output a set of cyber security risk factors 538, as described in further detail above. For instance, once the probabilities for each incident type are predicted, they may be combined to compute risk factor scores based on incident type to risk factor mapping, as described above.

In some implementations, the cyber risk analysis engine 104 may further use an aggregate risk factors model 540 to generate an aggregate risk factor 544 and/or industry risk factor 546. In some implementations, determining the aggregate risk factor score 544 may include training weights for each of risk factor score using a regression model. For instance, the cyber risk analysis engine 104 may calculate an aggregate risk factor score based on a weighted mean of the risk factor scores and external data. The aggregate risk factors model 540 may include a regression model or other computer model that may learn weights for each risk factor and/or other information.

In some implementations, the aggregate risk factors model 540 may combine weighted risk factor scores with additional information, such as external insights and/or aggregate input data 542. For instance, external insights or input data may include third-party rankings for an organization or industry, analytics, or other data pertaining to cyber security risk of a given organization, industry (e.g., industry risk), computing system type, etc. The external data including industry data for an industry in which the computing system is involved; and providing, by the processor, the aggregate risk factor score for display.

In some implementations, the cyber risk analysis engine 104 may use separate aggregate risk factors models 540 for each industry, industry sector, organization sector size, computing system type or size, enterprise network environment, etc.

The aggregate risk factor score 544 may be a single score that represents an overall cyber security risk for a given organization and/or associated computing system. The aggregate risk factor score 544 may be provided to an underwriter or IT professional as an example of the overall risk, for example, because the single score may be easier for a human to understand, for example, to see the cyber security risk relative to other organizations.

The industry risk factor score 546 may include scores aggregated across an industry or sector, for example, to show the cyber security risk of that particular industry (e.g., computing devices of an accounting firm may, on average, have higher cyber security risk than a civil engineering firm).

In some implementations, as described above, the risk factor scores may be used to continuously evaluate and underwrite cyber security insurance. For instance, because an understanding of cyber security risk requires access and real time or near real time understanding of computer data and operations, it both changes quickly and is time consuming. In some implementations, the end-to-end automation and set of artificial intelligence models described herein allow the cyber security risk of an organization and/or its computing systems to be determined in real-time or frequently. The cyber security risk assessment system 102 may continuously source data, logs, etc., and evaluate/revaluate risk factor scores.

Figure 5D:
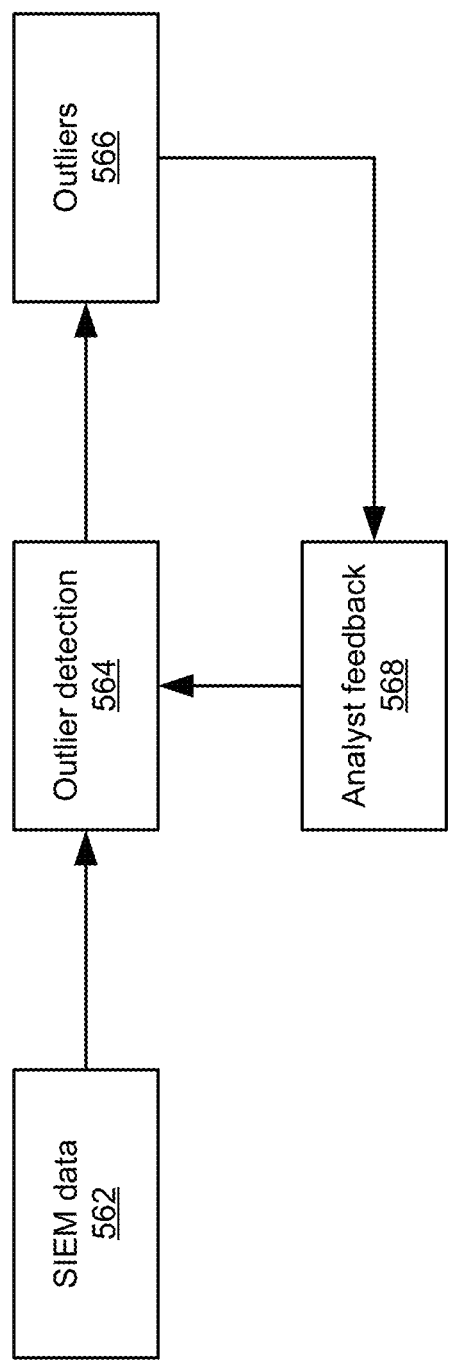
FIG. 5D illustrates an example method for detecting outliers in security and incident management system data.

FIG. 5D illustrates an example method for detecting outliers in SIEM data, according to some example implementations, for example, for recognizing one or more events.

In some implementations, the cyber risk analysis engine 104 may receive SIEM data, for example, in an input feature space, at 562, as described above. The cyber risk analysis engine 104 may use an event recognition model, such as a regression model, classification model, isolation forest, or other model for detecting outliers at 564, as described above. For instance, computer logs may be fed into an isolation forest, which may detect outliers in the computer logs. The cyber risk analysis engine 104 may output the outliers at 566, for example, as events, as described above.

In some implementations, the cyber risk analysis engine 104 may receive analyst feedback at 568 indicating whether an outlier should be classified as an event or whether the outlier is merely noise or a false positive. For instance, an input may be received from an analyst that indicates a true or false statement, which may then be used to train the event recognition model and improve recognition of outliers.

Figure 6:
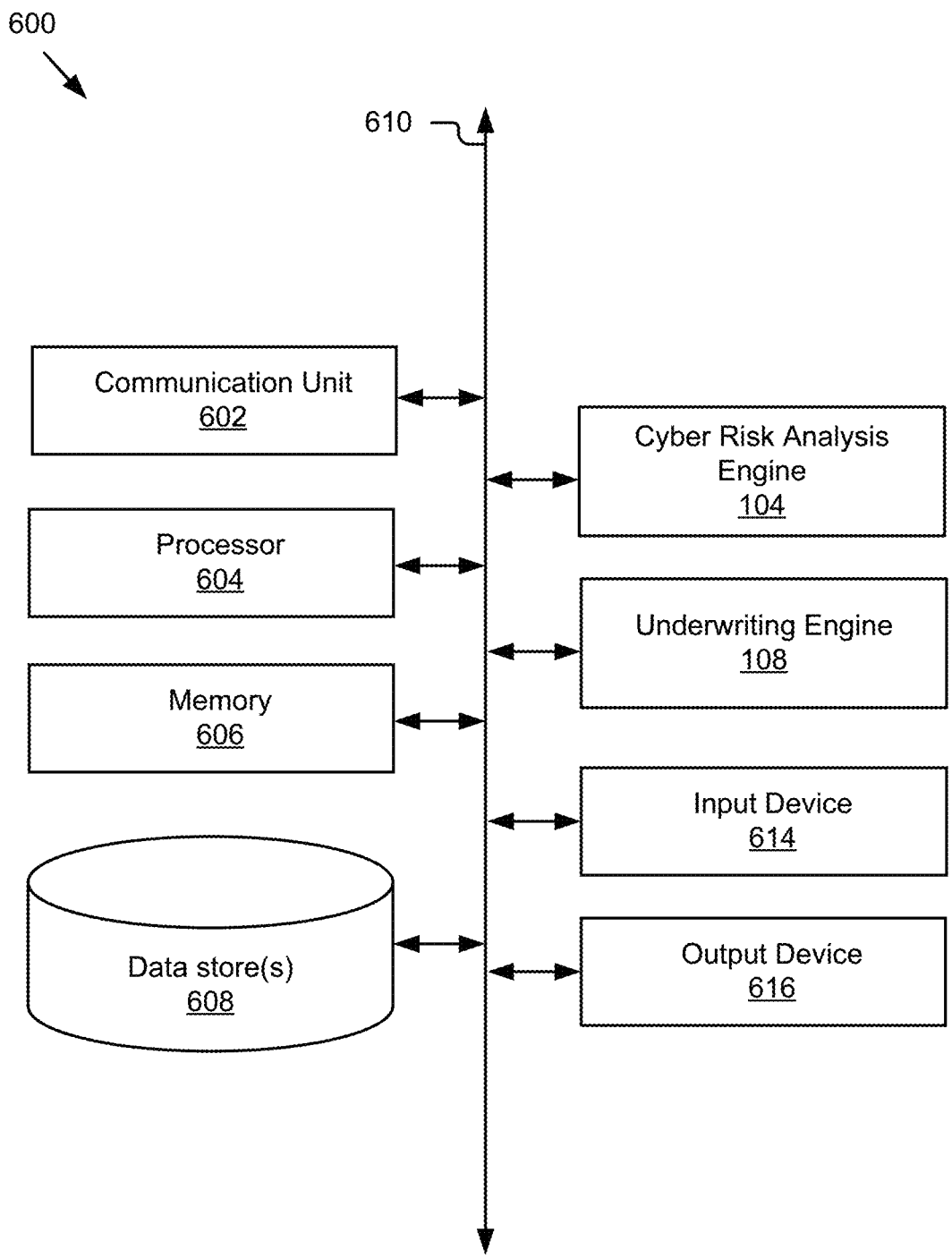
FIG. 6 is a block diagram illustrating an example computing device.

FIG. 6 is a block diagram illustrating an example computing device 600, such as the cyber security risk assessment system 102. The example computing system 600 may correspond to a cyber security risk assessment system 102, computing device or system being evaluated, or a component thereof, for example.

The cyber risk analysis engine 104, underwriting engine 108, etc., may include computer logic executable by the processor 604 on a computing system 600 to provide for the functionality described in reference to one or more of the components of the system 100.

As depicted, the computing system 600 may include a processor 604, a memory 606, a communication unit 602, an output device 616, an input device 614, and database(s) 608, which may be communicatively coupled by a communication bus 610. The computing system 600 depicted in FIG. 6 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 600 may include various operating systems, sensors, additional processors, and other physical configurations. Although, for purposes of clarity, FIG. 6 only shows a single processor 604, memory 606, communication unit 602, etc., it should be understood that the computing system 600 may include a plurality of one or more of these components.

The processor 604 may execute software instructions by performing various input, logical, and/or mathematical operations. The processor 604 may have various computing architectures to method data signals including, for example, a complex instruction set computer (CISC) architecture, a reduced instruction set computer (RISC) architecture, and/or an architecture implementing a combination of instruction sets. The processor 604 may be physical and/or virtual, and may include a single core or plurality of processing units and/or cores. In some implementations, the processor 604 may be capable of generating and providing electronic display signals to a display device, supporting the display of images, capturing and transmitting images, performing complex tasks including various types of feature extraction and sampling, etc. In some implementations, the processor 604 may be coupled to the memory 606 via the bus 610 to access data and instructions therefrom and store data therein. The bus 610 may couple the processor 604 to the other components of the computing system 600 including, for example, the memory 606, the communication unit 602, the input device 614, the output device 616, and the database(s) 608.

The memory 606 may store and provide access to data to the other components of the computing system 600. The memory 606 may be included in a single computing device or a plurality of computing devices. In some implementations, the memory 606 may store instructions and/or data that may be executed by the processor 604. For example, the memory 606 may store code and routines. The memory 606 is also capable of storing other instructions and data, including, for example, an operating system, hardware drivers, other software applications, databases, etc. The memory 606 may be coupled to the bus 610 for communication with the processor 604 and the other components of computing system 600.

The memory 606 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 604. In some implementations, the memory 606 may include one or more of volatile memory and non-volatile memory (e.g., RAM, ROM, hard disk, optical disk, etc.). It should be understood that the memory 606 may be a single device or may include multiple types of devices and configurations.

The bus 610 can include a communication bus for transferring data between components of a computing device or between computing devices, a network bus system including a network or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 602 may include one or more interface devices (I/F) for wired and wireless connectivity among the components of the system 100. For instance, the communication unit 602 may include various types known connectivity and interface options. The communication unit 602 may be coupled to the other components of the computing system 600 via the bus 610. The communication unit 602 may be electronically communicatively coupled to a network (e.g., wiredly, wirelessly, etc.). In some implementations, the communication unit 602 can link the processor 604 to a network, which may in turn be coupled to other processing systems. The communication unit 602 can provide other connections to a network and to other entities of the system 100 using various standard communication protocols.

The input device 614 may include any device for inputting information into the computing system 600. In some implementations, the input device 614 may include one or more peripheral devices. For example, the input device 614 may include a keyboard, a pointing device, microphone, an image/video capture device (e.g., camera), a touch-screen display integrated with the output device 616, etc.

The output device 616 may be any device capable of outputting information from the computing system 600. The output device 616 may include one or more of a display (LCD, OLED, etc.), a printer, a haptic device, audio reproduction device, touch-screen display, etc. In some implementations, the output device is a display which may display electronic images and data output by the computing system 600 for presentation to a user, such as a picker or associate in the order fulfillment center. In some implementations, the computing system 600 may include a graphics adapter (not shown) for rendering and outputting the images and data for presentation on output device 616. The graphics adapter (not shown) may be a separate processing device including a separate processor and memory (not shown) or may be integrated with the processor 604 and memory 606.

The database(s) are information source(s) for storing and providing access to data. The data stored by the database(s) 608 may be organized and queried using various criteria including any type of data stored by them, such as the data in the data store 106 and other data discussed herein. The database(s) 608 may include file systems, data tables, documents, databases, or other organized collections of data. Examples of the types of data stored by the database(s) 608 may include the data described herein, for example, in reference to the data store 106.

The database(s) 608 may be included in the computing system 600 or in another computing system and/or storage system distinct from but coupled to or accessible by the computing system 600. The database(s) 608 can include one or more non-transitory computer-readable mediums for storing the data. In some implementations, the database(s) 608 may be incorporated with the memory 606 or may be distinct therefrom. In some implementations, the database(s) 608 may store data associated with a database management system (DBMS) operable on the computing system 600. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The technology can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the technology may take, may be referred to as techniques. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more implementations of the technology is provided below along with accompanying figures that illustrate the principles of the technology. The technology is described in connection with such implementations, but the technology is not limited to any implementation. The technology encompasses numerous alternatives, modifications and equivalents. Numerous specific details are set forth in the following description in order to provide a thorough understanding of the technology. These details are provided for the purpose of example and the technology may be practiced without some or all of these specific details. For the purpose of clarity, technical material that is known in the technical fields related to the technology has not been described in detail so that the technology is not unnecessarily obscured.

The above detailed descriptions are provided to illustrate specific implementations of the present technology and are not intended to be limiting. Numerous modifications and variations within the scope of the present technology are possible.

What is claimed is:

1. A computer-implemented method comprising:
generating, by a processor, an input feature space by collecting data from one or more computer sources, the input feature space including data associated with a computing system;
recognizing, by the processor, one or more events based on the input feature space;
determining, by the processor, a severity of the one or more events using one or more computer models;
generating, by the processor, one or more risk factor scores based on the determined severity of the one or more events, each of the one or more risk factor scores indicating a computer security risk of a certain computer security aspect of the computing system, generating the one or more risk factor scores including determining a category of the one or more events using the input feature space;
generating, by the processor, an aggregate risk factor score of the computing system based on the one or more risk factor scores, the aggregate risk factor score being a synthesis of a plurality of sub-factors, where each sub-factor is weighted and correlates to each of the one or more risk factor scores; and
performing, by the processor, an action based on the aggregated risk factor score.

2. The computer-implemented method of claim 1, wherein performing the action based on the one or more risk factor scores includes performing a corrective action on the computing system to address the computer security risk, the action being based on a first risk factor score selected from the one or more risk factor scores, the one or more risk factor scores including multiple risk factor scores.

3. The computer-implemented method of claim 1, wherein performing the action based on the one or more risk factor scores includes sending the one or more risk factor scores to an underwriting engine, the underwriting engine including computer logic executable by the processor to determine cyber-security insurance including automatically assessing the one or more risk factor scores.

4. The computer-implemented method of claim 3, wherein the one or more risk factor scores include a first risk factor score and a second risk factor score, the first risk factor score being associated with the certain computer security aspect and the second risk factor score being associated with a second computer security aspect, the certain computer security aspect being associated with a first cyber security coverage type and the second computer security aspect being associated with a second cyber security coverage type.

5. The computer-implemented method of claim 1, wherein:
generating the input feature space includes receiving first data describing an external attempt to access the computing system; and
generating the one or more risk factor scores includes generating a network security cyber risk factor score including inputting the first data into the one or more computer models, the one or more risk factor scores including the network security cyber risk factor score.

6. The computer-implemented method of claim 5, wherein:
generating the input feature space includes receiving second data describing an operation of an endpoint client device coupled with the computing system; and
generating the one or more risk factor scores includes generating a compliance risk factor score including inputting the second data into the one or more computer models, the one or more risk factor scores including the compliance risk factor score.

7. The computer-implemented method of claim 6, wherein generating the aggregate risk factor score is further based on the network security cyber risk factor score and the compliance risk factor score.

8. The computer-implemented method of claim 1, wherein recognizing the one or more events includes:
receiving a network event log in the input feature space for the computing system; and
detecting an outlier event from the network event log.

9. The computer-implemented method of claim 1, further comprising:
computing a likelihood of one or more data-security breach incidents based on the input feature space using the one or more computer models; and
generating the one or more risk factor scores based on the computed likelihood of the one or more data-security breach incidents.

10. The computer-implemented method of claim 1, further comprising wherein generating the input feature space includes:
identifying one or more missing data components in the data collected from the one or more computer sources; and
determining one or more proxy data components corresponding to the one or more missing data components using statistical analysis of data for similar computing systems to the computing system.

11. The computer-implemented method of claim 10, further comprising:
predicting one or more data security breach incidents using the input feature space using the one or more computer models, the input feature space indicating one or more previous data security breach incidents; and
classifying the one or more data security breach incidents and the one or more events based on their severity using the one or more computer models, the one or more events including data outliers in the input feature space.

12. The computer-implemented method of claim 11, wherein generating the one or more risk factor scores includes:
inputting the one or more severity-classified data security breach incidents and the one or more severity-classified events into one or more risk factor models, the one or more risk factor models including a heuristic rule-based mapping that maps the one or more severity-classified data security breach incidents and the one or more severity-classified events to a defined risk factor score of a plurality of risk factor scores, the one or more risk factor scores including the plurality of risk factor scores.

13. The computer-implemented method of claim 12, wherein generating, by the processor, the aggregate risk factor score further comprises calculating the aggregate risk factor score from a combination the plurality of risk factor scores in a weighted summation where weights of the plurality of risk factor scores are provided by a machine learning model.

14. A system comprising a processor and memory storing instructions that, when executed by the processor cause the system to:
- generate an input feature space by collecting data from one or more computer sources, the input feature space including data associated with a computing system;
- recognize one or more events based on the input feature space;
- determine a severity of the one or more events using one or more computer models;
- generate one or more risk factor scores based on the determined severity of the one or more events, each of the one or more risk factor scores indicating a computer security risk of a certain computer security aspect of the computing system, generating the one or more risk factor scores including determining a category of the one or more events using the input feature space;
- generate an aggregate risk factor score of the computing system based on the one or more risk factor scores, the aggregate risk factor score being a synthesis of a plurality of sub-factors, where each sub-factor is weighted and correlates to each of the one or more risk factor scores; and
- perform an action based on the aggregated risk factor score.

15. The system of claim 14, wherein performing the action based on the one or more risk factor scores includes performing a corrective action on the computing system to address the computer security risk, the corrective action being based on a first risk factor score selected from the one or more risk factor scores, the one or more risk factor scores including multiple risk factor scores.

16. The system of claim 14, wherein performing the action based on the one or more risk factor scores includes sending the one or more risk factor scores to an underwriting engine, the underwriting engine including computer logic executable by the processor to determine cyber-security insurance including automatically assessing the one or more risk factor scores.

17. The system of claim 16, wherein the one or more risk factor scores include a first risk factor score and a second risk factor score, the first risk factor score being associated with the certain computer security aspect and the second risk factor score being associated with a second computer security aspect, the certain computer security aspect being associated with a first cyber security coverage type and the second computer security aspect being associated with a second cyber security coverage type.

18. The system of claim 14, wherein the instructions, when executed by the processor, further cause the system to:
- predict one or more data security breach incidents using the input feature space using the one or more computer models, the input feature space indicating one or more previous data security breach incidents; and
- classify the one or more data security breach incidents and the one or more events based on their severity using the one or more computer models, the one or more events including one or more data outliers in the input feature space.

19. The system of claim 18, wherein generating the one or more risk factor scores includes:
- inputting the one or more severity-classified data security breach incidents and the one or more severity-classified events into one or more risk factor models, the one or more risk factor models including a heuristic rule-based mapping that maps the one or more severity-classified data security breach incidents and the one or more severity-classified events to one of a plurality of risk factor scores, the one or more risk factor scores including the plurality of risk factor scores.

20. A system comprising:
- means for generating an input feature space by collecting data from one or more computer sources, the input feature space including data associated with a computing system;
- means for recognizing one or more events based on the input feature space;
- means for determining a severity of the one or more events using one or more computer models;
- means for generating one or more risk factor scores based on the determined severity of the one or more events, each of the one or more risk factor scores indicating a computer security risk of a certain computer security aspect of the computing system, generating the one or more risk factor scores including determining a category of the one or more events using the input feature space;
- means for generating an aggregate risk factor score of the computing system based on the one or more risk factor scores, the aggregate risk factor score being a synthesis of a plurality of sub-factors, where each sub-factor is weighted and correlates to each of the one or more risk factor scores; and
- means for performing an action based on the aggregated risk factor scores.

* * * * *